Dec. 16, 1958   B. R. MILLER   2,864,500
SCREEN FRAME
Filed May 11, 1954
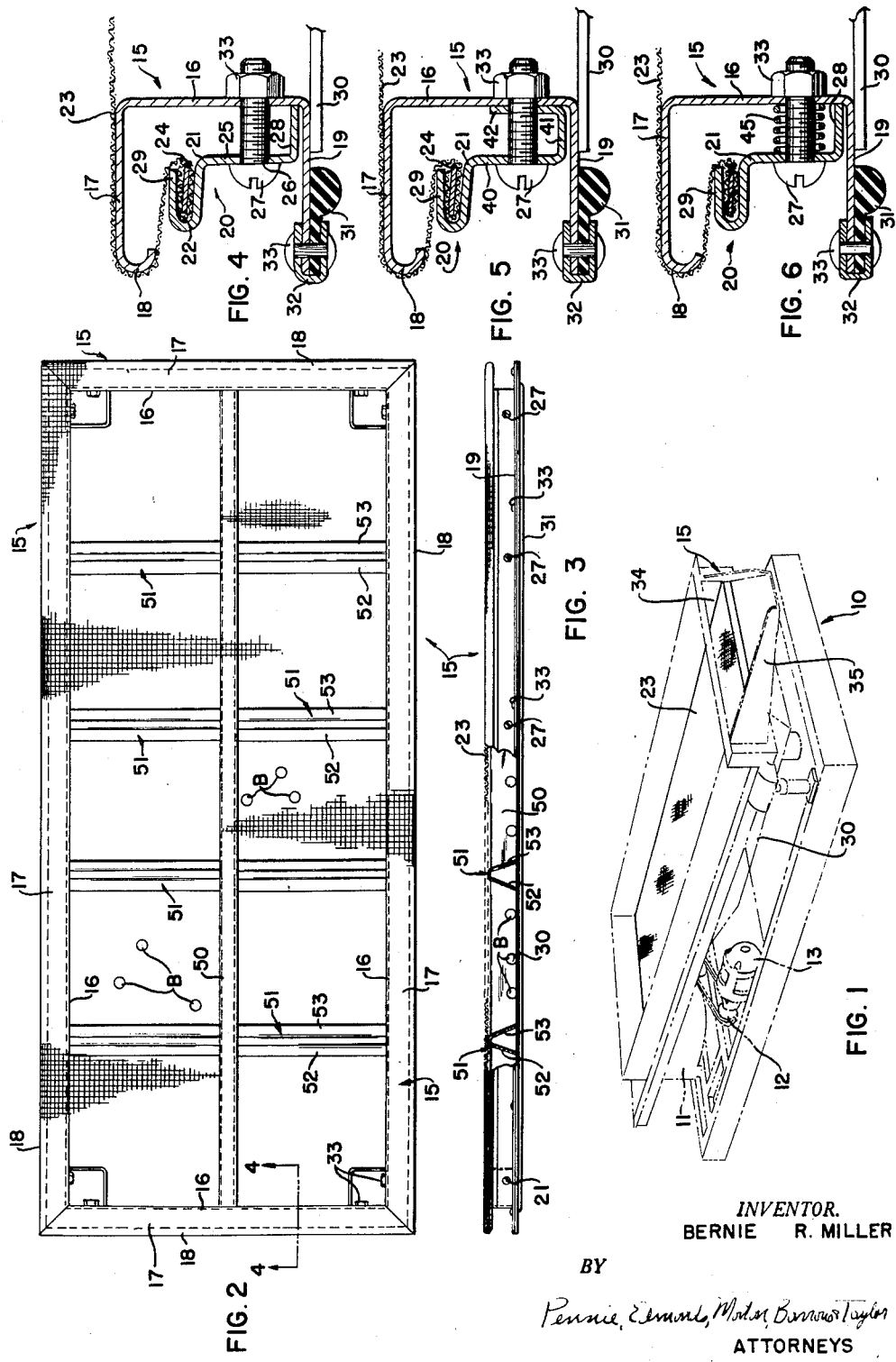
INVENTOR.
BERNIE R. MILLER
BY
Pennie, Edmonds, Morton, Barrows & Taylor
ATTORNEYS United States Patent Office 2,864,500
Patented Dec. 16, 1958

2,864,500
SCREEN FRAME

Bernie R. Miller, East Liverpool, Ohio, assignor, by mesne assignments, to Ferro Corporation, Cleveland, Ohio, a corporation of Ohio Application May 11, 1954, Serial No. 428,878

6 Claims. (Cl. 209—403)

This invention relates to frames for supporting screen cloths used in the screening of various materials and provides an improved screen frame including a frame structure and screen clamping means for securing the screen cloth. The screen frame of my invention is especially suited for use on gyratory, reciprocating or vibrating machines of the type widely used for shaking screens for screening, sifting, or size classifying raw materials or products, in a wet or dry condition.

The screen frame of my invention is characterized by the ease and economy with which a screen cloth can be mounted across the frame with uniform tension, regardless of the composition of the screen cloth. Tension on the screen cloth is readily adjusted by simple fastening and adjusting means on the screen frame.

The frame structure of my invention comprises an inner peripheral wall portion and an outwardly extending support plate on which the screen cloth rests and around which the screen cloth is drawn and a clamping means in which the extremities are held. At least one clamp, and preferably a number of clamps, are provided at the sides of the frame structure and have means for gripping the screen cloth beneath the support plate and within the confines of the frame structure. Means are provided for connecting the clamp and the frame structure for adjusting the relation between the gripping means and the frame and thereby adjusting the tension in the screen cloth to maintain it uniformly taut to eliminate sagging and the collection of material on the sagging portions of the screen cloth. The clamping means includes adjustable means such as a threaded nut and bolt for varying the spaced relation between the clamps and the wall portion of the frame structure to vary the tension on various parts of the screen. In one embodiment of the invention, spring means are mounted in operative connection between the frame structure and the clamp to apply a resilient tension on the screen to facilitate maintaining it in a uniformly taut but yieldable position.

The improved screen frame of my invention eliminates the necessity to shut down the vibrating machine at frequent intervals for tightening or repairing screen cloth. Tearing of the screen cloth and sagging are avoided, and the screen frame can be used on all types and sizes of screens.

These and other features of the invention will be more fully understood by reference to the accompanying drawings, in which Fig. 1 is a perspective view of a screen frame of the invention when mounted on a typical screen sifting apparatus;

Fig. 2 is a plan view of the screen frame and screen shown in Fig. 1;

Fig. 3 is a side view, partially in section, of the screen frame of Fig. 2;

Fig. 4 is an enlarged fragmentary sectional view taken at 4—4 of Fig. 2;

Fig. 5 is a view similar to Fig. 4 of a modified screen fastening device, and

Fig. 6 is a view similar to Fig. 4 of still another modification of screen fastening device.

The screen frame and screen cloth attached to or mounted thereon are shown in Fig. 1 in operative connection with a typical sifter 10, the screen frame being subjected to a shaking action imparted to it by a drive head 11, driven through a belt 12 by a motor 13. The shaking action may be imparted to the screen frame with any suitable apparatus which may have a gyratory, reciprocating or vibratory motion, the apparatus for providing such motion forming no part of this invention.

The screen frame comprises a rectangular sheet metal frame structure 15 in the general shape of a channel bar comprising an inner generally upright wall portion 16, an upper lateral support plate 17 lying substantially in a horizontal position and having a smoothly curved end portion 18 and a flat base plate 19 which is also horizontal, and a screen clamping means 20.

A screen floor 30, such as a sheet of metal, is suitably attached to the base plate 19 of the frame 15 to enclose the sifting area provided between the wall portions 16. This screen floor 30 may be another screen cloth having a smaller mesh than the screen cloth 23 to effect a further classification of material.

The screen fastening or tightening clamp means shown in greater detail in Fig. 4 is preferably provided on each side of the frame 15 in order to secure the screen cloth and provide a uniform degree of tension on the screen cloth. The clamping means comprises a bracket 21 having a slotted portion 22 defined by an outwardly extending flange whose free end 29 is bent over and inwardly in spaced relation to the outwardly extending flange to form a generally U-shaped section having its open side facing toward the wall portion 16, an upright portion 25 and a lateral flange 28. The slot 22 underlies the face plate 17 of the screen frame while lying within the outline of its curved extremity 18. The border portions of the screen cloth 23 are wrapped around a flat key or bar 24 and are then wedged in the slot. The screws 27 extend from the outer face of clamp 20 through spaced holes 26 in the upright portion 25 and through the inner wall portion 16 of the screen frame, each screw being threaded to a nut 33 bearing on the inner face of the wall portion 16.

The screen cloth 23 spans the space across the screen frame and is mounted on the frame structure 15 in the following manner: The border portions of the screen cloth are first drawn over, around and under the curved portion 18 of the frame structure and their free edges are then wrapped around the flat bar 24 as required, depending upon the material of the screen cloth and the friction required to be developed on the surfaces of the slot 22. The bar 24 and the overlying screen cloth are then inserted into the slot 22. Tension is placed on the screen cloth by taking up on each of the screws 27. It will be noted that as the spaced relation between the clamp 20 and the inner peripheral wall portion 16 is reduced, tension on the screen cloth increases. It will be noted that the slotted portion of the bracket is so spaced from the bolts that it has a slight springiness providing a slight give or resiliency to the screen and that the flange 28 limits the movement of the bracket while permitting a certain amount of pivotal action.

The under portion of plate 19 has a resilient rubber member 31, secured all around the periphery by the clip 32 and pins or rivets 33. The rubber member has a curved depending portion which rests upon a cooperating base portion (not shown) of the sifter. This rubber member serves as a yieldable cushion support as a seal against the escape of dust and a means to facilitate the vibratory action. With reference to Fig. 1, there is a gradual slope towards the right so that the coarse material will work its way to that end and be discharged through the port 34 and chute 35. When the screen floor 30 serves to receive the material from screen 23, it may be shaped somewhat like a hopper to receive and direct the material into a container such as a bag or barrel.

Referring to Fig. 5, a modified form of bracket 40 for the clamp is shown having substantially the same structural relation to the frame structure 15 as the bracket of Fig. 4. In this modification, however, the lateral flange 41 is bent upwardly, providing a leg 42 which bears against the flat wall 16 when the screen is stretched to its maximum tension. This bracket differs functionally from that of Fig. 4 in that the flange portion 41 does not pivot against the wall 16. However, upwardly extending flange 42 bearing against the outer surface of wall portion 16 is adapted to assure a positive resilient reaction to lateral tension transferred to the bracket from the screws 27.

Likewise, the modification of clamping means shown in Fig. 6 is generally similar to that in Fig. 4. In this modification, however, a coil spring 45 surrounds the screws 27 between the bracket 21 and the wall portion 16 of the frame to provide yieldable tension on the screen cloth.

As shown in Figs. 2 and 3, longitudinal separator 50 may be suitably mounted between the opposite longitudinal sides of the frame structure 15. Also, a number of transverse dividers 51 having slanted sides 52 and 53 may be provided across the space between the longitudinal sides of the frame structure 15 and the longitudinal spacer 50. Thus, the area between the frame structure is divided into a number of compartments enclosed between the sifting area of the screen cloth 23 and the screen floor 30 or similar enclosure on the under side of the screen. A number of elastic rubber balls B supported by the floor plate 30 are enclosed in each of the compartments beneath the screen cloth for tapping against the screen cloth to distribute the material thereon and facilitate screening. The balls move in a random manner by being deflected from the inner wall portion 16, the sides of the spacer 50, and the slanting sides 52 and 53 of dividers 51.

As material is loaded onto the screen cloth, the balls tap against the under surface of the screen cloth and promote even distribution of the material, thereby advantageously using the entire surface area of the screen cloth to increase the speed of passage of fine materials therethrough. Where sagging of the screen cloth occurs, tension in the sagging region of the screen cloth may be increased by taking up on the screws 27 located in line therewith. This reduces the tendency of fine material to collect in such sagging regions and enables the rubber balls B to be more effective in their material-distributing function.

The screen frame of the invention can be used effectively to mount any type of screen cloth whether of a textile or metallic nature, and thus is capable of universal application to a wide variety of screen mesh sizes and uses.

I claim:

1. A screen frame comprising a frame structure and a screen clamp for supporting a screen cloth in taut spanning relation to the frame structure, the frame structure including a lateral support plate having a curved exterior edge, a screen cloth mounted over the support plate and drawn around the curved exterior edge, the clamp being on at least one side of the frame structure inwardly of the curved edge and having a slot, a bar within said slot and gripping the border of the screen cloth, and holding it within said slot, said clamp having a pivotal connection with the frame structure at one portion and the screen gripping means at a movable portion and bolts connecting the frame structure with the clamp near the pivotal connection for adjusting the tension on the screen cloth to maintain it in a uniformly taut position.

2. A screen frame comprising a frame structure and a screen clamp, and a screen cloth spanning the frame structure for use in combination with means for shaking the screen frame to facilitate passage of materials through the screen cloth, the frame structure including an upright wall portion and a support plate extending laterally outwardly from the wall portion and having a rounded exterior edge, the screen cloth being mounted over the support plate and drawn around the rounded exterior edge, a clamp on at least one side of the frame structure having a slot and bar within the lateral extremity of the support plate for gripping the border of the screen cloth, and spring means operatively connecting the clamp and the frame structure for adjusting the relation between the gripping means and the frame structure to draw the screen cloth around the rounded exterior edge to hold the screen cloth uniformly taut.

3. A screen comprising a frame structure including a generally vertically-extending wall portion and a screen supporting means extending outwardly from one edge thereof, said screen supporting means having its outer free edge curved in a direction towards said wall portion, a screen spanning the frame structure and having its edge portion extending over said screen supporting means and around the curved edge thereof, and means for gripping the edge portion of the screen which passes around said curved edge and clamping it to the frame structure, said gripping and clamping means including a clamping member inwardly of said curved edge and having a slot in which the edge portion of the screen is secured, said slot being formed by a generally U-shaped bend in the clamping member and having its open side facing toward said vertically-extending wall portion of the frame, and adjustable means connecting said clamping member to said vertically-extending wall portion of the frame.

4. A screen comprising a frame structure including a generally vertically-extending wall portion and a screen supporting means extending outwardly from one edge thereof, said screen supporting means having its outer free edge curved in a direction towards said wall portion, a screen spanning the frame structure and having its edge portion extending over said screen supporting means and around the curved edge thereof, and means for gripping the edge portion of the screen which passes around said curved edge and clamping it to the frame structure, said gripping and clamping means including a clamping member inwardly of said curved edge and having a slot in which the edge portion of the screen is secured, said clamping member having a portion so bearing on said vertically-extending wall portion as to provide for pivotal movement of the clamping member with respect to said wall portion, and adjustable bolt and nut means connecting said clamping member to said vertically-extending wall portion of the frame.

5. A screen as set forth in claim 4 including resilient means interposed between said vertically-extending wall portion and the gripping and clamping member and exerting a force tending to move the clamping member away from said wall portion.

6. A screen comprising a frame structure including a generally vertically-extending wall portion and a screen supporting means extending outwardly from one edge thereof, said screen supporting means having its outer free edge curved in a direction towards said wall portion, a screen spanning the frame structure and having its edge portion extending over said screen supporting means and around the curved edge thereof, and means for gripping the edge portion of the screen which passes around said curved edge and clamping it to the frame structure, said gripping and clamping means including a clamping member inwardly of said curved edge and having a slot in which the edge portion of the screen is secured, said gripping and clamping member including a generally U-shaped portion, one leg of said U-shaped portion lying against said vertically-extending wall portion and the slot in which the edge portion of the screen is located being at the free end of the other leg of the U-shaped portion, and adjustable means connecting said clamping member to said vertically-extending wall portion of the frame.

References Cited in the file of this patent

UNITED STATES PATENTS

| | | |
|---|---|---|
| 313,152 | Allfree | Mar. 3, 1885 |
| 1,265,267 | Simpson | May 7, 1918 |
| 2,183,991 | Hasman | Dec. 19, 1939 |
| 2,338,523 | Lincoln | Jan. 4, 1944 |
| 2,630,225 | Bye | Mar. 3, 1953 |
| 2,638,220 | Schneider | May 12, 1953 |

FOREIGN PATENTS

| | | |
|---|---|---|
| 123,734 | Sweden | Nov. 4, 1948 |